March 9, 1965 C. R. VENABLE, JR 3,172,924
CARBON BLACK PRODUCING FURNACE AND CONSTRUCTION OF SAME
Filed Dec. 18, 1961 2 Sheets-Sheet 1
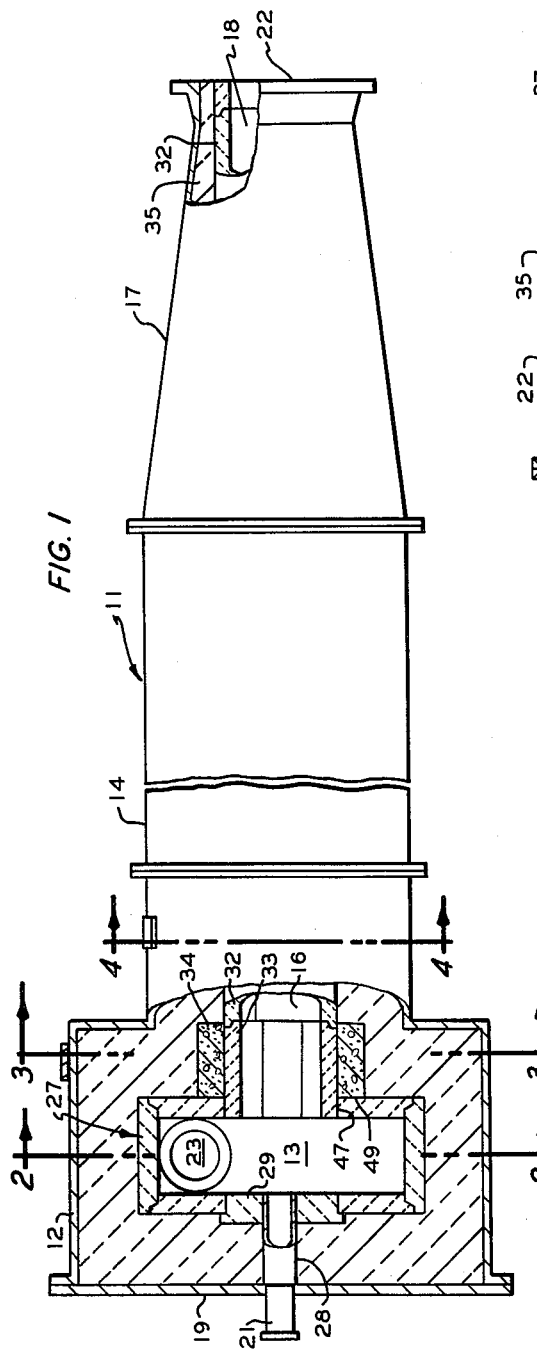
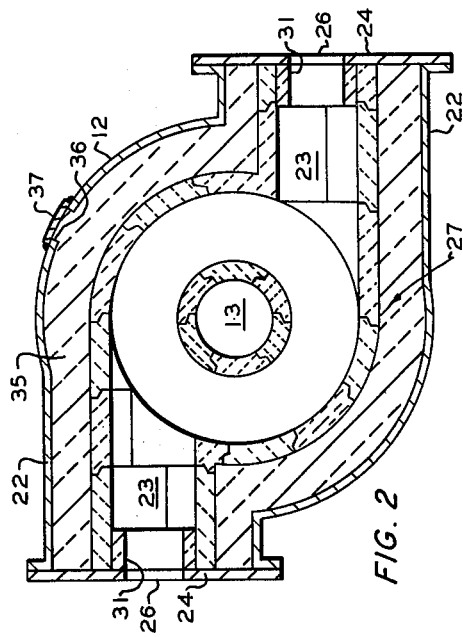
INVENTOR.
C.R. VENABLE, JR.
BY Young E. Quigg
ATTORNEYS March 9, 1965  C. R. VENABLE, JR  3,172,924
CARBON BLACK PRODUCING FURNACE AND CONSTRUCTION OF SAME
Filed Dec. 18, 1961  2 Sheets-Sheet 2

INVENTOR.
C. R. VENABLE, JR.
BY Young E. Quigg
ATTORNEYS

United States Patent Office 3,172,924
Patented Mar. 9, 1965

3,172,924
CARBON BLACK PRODUCING FURNACE AND
CONSTRUCTION OF SAME
Charles R. Venable, Jr., Bartlesville, Okla., assignor
to Phillips Petroleum Company, a corporation of
Delaware
Filed Dec. 18, 1961, Ser. No. 160,076
2 Claims. (Cl. 264—30)

This invention relates to carbon black producing furnaces. In another aspect it relates to a method of constructing a carbon black producing furnace.

The production of carbon black by the so-called furnace method has become well known in recent years. These furnaces are generally characterized by an elongated cylindrical chamber. The reactant materials are introduced into a precombustion section attached upstream from a reaction section. Quench means are provided in the reaction section or downstream thereof. The configuration of the various chambers and the position of quenching means influence the properties of the carbon black produced. Commercial carbon black producing furnaces are of considerable size and are subjected to very high temperatures, and as such require large quantities of refractories which make their construction, maintenance and replacement expensive. While some of these furnaces are satisfactory under certain conditions of operation, others do not give long service because of the way they are constructed and the high temperatures produced in the furnaces. These conditions can cause melting and rapid deterioration of the refractories, especially at the inlet end of the reaction section.

Accordingly, it is an object of this invention to provide an improved carbon black producing furnace. Another object is to provide a novel method of constructing such a furnace. Another object is to provide a novel carbon black furnace and a method of constructing the same such that the high reaction temperatures encountered can be tolerated without melting or deteriorating refractories, particularly at the inlet end of the reaction section. These and other objects will become apparent to those skilled in the art from the following discussion, appended claims and accompanying drawing.

In the drawing, FIGURE 1 is an elevational view in section of a carbon black furnace constructed according to this invention;

FIGURES 2, 3 and 4 are elevational views in section of FIGURE 1 taken along the planes indicated;

Figure 3:
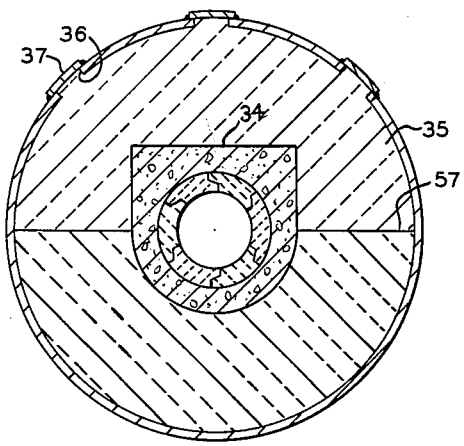
Figure 4:
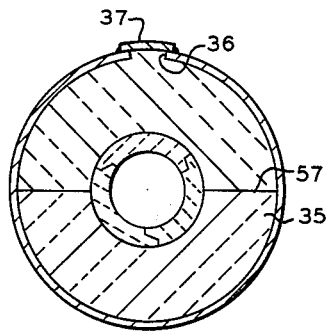

Briefly, the carbon black furnace of this invention is constructed by first horizontally suspending within the horizontal lower half of that portion of the shell of the furnace which will surround the reaction chamber a removable semi-cylindrical core having an enlarged portion near the end of said core adjacent the inlet end of said reaction chamber. A castable refractory material (refractory concrete) is then placed in the semi-cylindrical recess formed between the lower outer surface of said core and the adjacent inner wall of said shell. The so-placed castable refractory is allowed to set up to a hard mass. The core is then removed from the shell, leaving a semi-cylindrical channel in the hardened refractory conforming to the outer dimensions of said core. A cylinder of precast refractory is then positioned within said shell to form a lining, the inner cylindrical surface of which will define the reaction chamber, that portion of said lining adjacent the inlet end of the reaction chamber being formed of special precast refractory which has a higher degree of refractoriness than the rest of the precast refractory used in forming said lining. A semi-cylindrical recess is left between the castable refractory and precast refractory, said recess conforming to the dimensions of said enlarged portion of said core. A mold is then placed on top of said lining disposed above said recess. A castable refractory (refractory concrete) is then poured into said mold and said recess, this castable refractory having a higher degree of refractoriness than that castable refractory placed between said shell and said lining. After the castable refractory placed in said recess has set up to a hard mass the mold is removed from within the interior of the shell, leaving a block of this castable refractory surrounding that portion of said lining adjacent the inlet end of said reaction zone. Further castable refractory, like that placed between the shell and lining, is then poured into the upper half of said shell between the upper inner wall thereof and the adjacent upper surfaces of said block and the rest of said lining. This latter refractory is allowed to set up to a hard mass, after which the two castable refractory materials are dried and heated at elevated temperatures to completely dehydrate the same and allow maximum strength to develop.

Referring now to the drawing, and initially to FIGURE 1, I have illustrated a carbon black producing furnace constructed according to this invention. This furnace has a metal shell generally designed 11 comprising an enlarged cylindrical portion 12 surrounding a precombustion chamber 13, a cylindrical portion 14 (preferably of reduced diameter) surrounding a reaction chamber 16, and a portion 17 (preferably tapered as shown) surrounding a quench chamber 18. The open end of precombustion section 12 is provided with a circular end plate 19 having an axial opening in which is disposed a suitable pipe 21 attached to receive an inlet nozzle for the injection of reactant materials (e.g., vaporized oil and air). The outlet end 22 of the furnace is adapted to be connected to the conventional smoke header to convey the carbon black-laden gases to suitable carbon black recovery equipment. The precombustion section 12 of the shell is preferably provided with two oppositely disposed tangential extensions 22 each of which surrounds a tangential tunnel 23 to provide for the tangential entry of gases (e.g., a mixture of natural gas and air) into the precombustion chamber 13. The open ends of tangential sections 22 are covered by plates 24 having axial openings 26 to receive suitable nozzles for the introduction of said tangential gases.

Precombustion chamber 13 and tangential tunnels 23 are defined by cylindrical linings 27 of precast refractory material such as Mullfrax-W, which is fabricated in the form of special shapes cemented together with suitable mortar. I prefer to build that portion of the precombustion chamber lining 27 surrounding said inlet 28 from precast refractory such as Alfrax-PK which is more refractory than the rest of the refractory used in building up the lining 27. This more refractory material can be used to fabricate linings 31 defining the inlet portion of the tangential tunnels 23.

The main downstream portion of reaction chamber 16 and all of quench chambers 18 are defined by a plurality of contiguous segmental rings or cylinders 32 formed from precast refractory such as Mullfrax-W to provide a cylinder thereof. The inlet end of reaction chamber 16 is defined by a segmental ring or cylinder 33 formed of the same highly refractory material, e.g., Alfrax-PK, used to form the cylinder 29 adjacent the said inlet tube 28. Surrounding this latter ring 33 I provide castable refractory material such as Kaocrete-32 in the form of a cast block 34 which serves to back up lining 33. Finally, the annular space between the inner wall of shell 11 and the outer surfaces of lining 27, block 34 and lining 32, the space between the inner wall of circular plate 19 and the adjacent surfaces of ring 29 and lining 27, and the annular space between the inner wall of tangential shell extensions 22, tangential plates 24 and adjacent portions of the lining 27 defining the tangential tunnels 23, are filled with castable refractory 35 such as Kaocast. Shell 11 can be provided with suitable openings 36 along the upper half thereof to provide a means for inserting or pouring in the castable refractory, after which said openings are closed by cover plates 37 welded to the outer adjacent surfaces of the shell.

The carbon black furnace just described has essentially a bilithic refractory lining with a trilithic lining surrounding the inlet end of the reaction chamber 16. It is the inlet end of the reaction tunnel 16 where the highest operating temperatures are encountered. In the case of preheated air carbon black reactors, temperatures can reach as high as 3100–3200° F. in the hottest part of the furnace. If desired, this trilithic lining can extend further downstream of the inlet end of the reaction tunnel. The degree of refractoriness of components in the trilithic lining and the bilithic lining increases from the outer layer to that inner layer defining the various furnace chambers.

Construction of such a furnace is not a simple matter, and I have in another aspect of my invention provided a method for constructing this furnace, which method will now be described.

Figure 5:
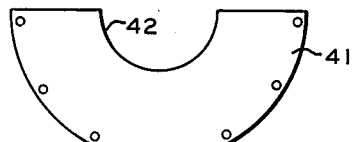
FIGURE 5 is an elevational view of a dam used in constructing the carbon black furnace according to this invention.

Initially, furnace shell sections 12 and 14 are disposed horizontally and a reference wire can be installed on the axial centerline of this portion of the furnace. A dam 41, such as shown in FIGURE 5, having a semi-circular shape with an inner cutout portion 42, is installed at the outlet end of the reaction shell section 11 and bolted to the bottom half of a flange provided at this end of shell section 14. Precast refractory shapes, made of Mullfrax-W for example, are installed in the bottom half of the precombustion shell section 12 to form the bottom half of the lining 27 disposed in this shell section. This can be accomplished by inserting tapered bolts in suitable holes provided in the adjacent portions of precombustion shell section 12 to support the precast shapes as they are cemented together. The highly refractory lining portions 29 and 31, made of Alfrax-PK for example, can also be installed at this time, along with a feed tube 28 made of Refrax, for example.

Figure 6:
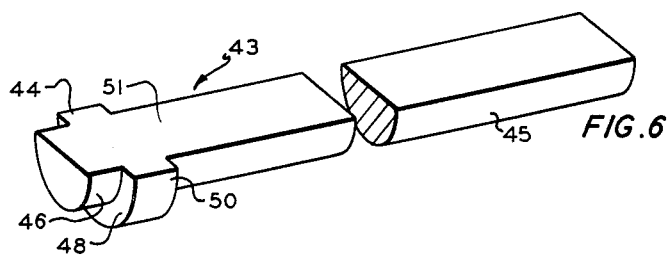
FIGURE 6 is an isometric view of a core used in constructing such a carbon black furnace.

Thereafter, a semi-cylindrical core 43, such as that shown in FIGURE 6, is positioned within the shell sections 12, 14. This core 43 can be built from any suitable material, such as wood or sheet metal and it is provided with an enlarged portion 44 near one end thereof. The core 43 can be suspended in the shell by allowing the rear of the lower core surface 45 to rest on the cutout portion 42 of dam 41 and allowing the front end of the outer core surface 46 to rest on the semi-circular groove 47 provided in that portion of the precombustion refractory lining 27 adjacent the inlet end of reaction chamber 16. The front vertical surface 48 of enlarged core portion 44 is allowed to abut the adjacent portion 49 of precombustion refractory lining 27. The core 43 can be securely placed in its position by wedging rods or the like between the upper surface 51 of the core and the adjacent inner surface of the shell section 14.

With the core 43 in place, cover plate 19 is installed in the position shown in FIGURE 1, as are the tangential cover plates 24. Castable refractory such as Kaocast is then poured into the bottom half of the precombustion chamber and reaction chamber formed between the outer surface of precombustion lining 27 and lower surfaces 45, 46 and 50 of core 43, and the inner wall of shell sections 12, 14. This cast refractory is allowed to set up to a hard mass, and then the core 43 is removed from the interior of the shell.

After the core 43 is removed, there is left a semi-circular groove or channel in the hardened refractory with an enlarged portion adjacent the inlet end of the reaction chamber, conforming to the dimensions of the removed core. The precast refractory shapes which make up lining portion 33 and lining 32 are then installed, as are the remaining portions of lining 27 in the upper half of the precombustion chamber and upper tangential section.

Figure 7:
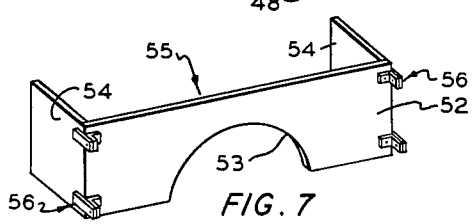
FIGURE 7 is an isometric view of a mold used in constructing such a furnace.

A mold 55, such as shown in FIGURE 7, is then installed directly above the semi-circular recess in the hardened refractory. This mold 55 is preferably constructed in three pieces with a transverse member 52, having a semi-circular cutout portion 53 in the lower half thereof, and two extending members 54 attached to the two ends of member 52 by means of bolted flanges 56. The curvature of the cutout portion 52 of member 53 conforms in dimensions to the curvature of the upper outer surface of lining 32 and rests thereupon, with the front ends of the extending members 54 abutting the rear wall 49 of precombustion lining 27 and the bottom edges of members 52, 54 resting on the upper surface 57 (see FIGURE 3) of the hardened refractory. Castable refractory material such as Kaocrete-32 is then poured into the upper open end of the mold 55 filling the same as well as the semi-cylindrical recess left in the hardened refractory. After the refractory has set up in mold 55, the latter is removed from the interior of the shell and the remaining precast refractory shapes installed to complete the remainder of lining 32. A dam similar to that shown in FIGURE 5 is then installed on the upper half of the outlet opening of shell section 11. Further castables such as Kaocast is then poured into the upper half of the precombustion shell section 12 and reaction section 14. After this latter refractory has set up, the dam and tapered bolts in the precombustion section can be removed.

The quench section of the furnace can be constructed by building up the lining 32 of precast refractory in an upright manner upon a suitable plate after which the quench shell section 17 is lowered about the lining. Castable refractory such as Kaocast is poured into the upper open end of the annular space formed between lining 32 and the inner wall of shell section 17. After this refractory has set up, the thus assembled quench section can be bolted to the downstream end of the assembled shell sections 12, 14. The thus assembled furnace can then be subjected to elevated temperatures to dry and dehydrate the castable refractory materials. This can be accomplished by installing a small portable air heater in the lower tangential tunnel 23 to first hold the shell temperature at 250–400° F. for 24 hours, and then raise the temperature 25° F. per hour until the inside of the reactor is approximately 1000° F., at which temperature the inner refractory lining 32 will show a slight red color. This temperature inside the reactor is held for about 24 hours, after which the portable air heater is removed from the lower tangential tunnel. The tangential burners can then be installed and the temperature of the inside of the reactor is raised at about 50° per hour, using only the bottom tangential burner, until the inside temperature of the reactor reaches about 1500° F. Thereafter, burners in both tangential tunnels are used until the reactor temperature reaches 2200° F. During this period the interface temperature between the lining 32 and refractory 35 will reach about 1800 to 1900° F. as dehydration progresses. After complete curing, the plates 37 are welded in place, and the completed furnace is ready to use in the production of carbon black.

In the following table, I have set forth a description of the various refractory materials which can be used in this invention, but such description should not be construed to limit unduly this invention.

Table I

| | Reactor lining 33, precombustion lining 29, 31 | Reactor and quench linings 32, precombustion lining 27 | Primary back-up refractory 34 | Secondary back-up refractory 35 |
|---|---|---|---|---|
| Nature of refractory | Precast refractory shapes of high alumina (90 wt. percent $Al_2O_3$ or higher). | Precast refractory shapes of mullite or high alumina (70-91 wt. percent $Al_2O_3$ or higher). | Castable refractory suitable for service at 3,200° F. min., comprising alumina (50 wt. percent $Al_2O_3$ and higher) and calcium aluminate cement. | Castable refractory suitable for service at 3,000° F. min., comprising alumina (50 wt. percent $Al_2O_3$ and higher) and calcium aluminate cement (kaolin can be added). |
| Composition, wt. percent: | | | | |
| $Al_2O_3$ | 90-99 | 70-91 | 50-94 | 50-65. |
| $SiO_2$ | 0.5-7.0 | 9-25 | Nil-29 | 30-35. |
| CaO | Nil-0.2 | Trace-0.2 | 2.4-5.4 | 2.2-3.4. |
| Other Oxides | 0.5-1.1 | 0.7-2.0 | 0.5-3.7 | 3.2-3.8. |
| Melting Point (ASTM C-24-56), ° F. | 3,400-3,620 | 3,335-3,425 | 3,297-3,400 | 3,200-3,290. |
| Specific Examples: | | | | |
| Trademark | Alfrax-PK | Mullfrax-W | Kaocrete-32 | Koacast. |
| Composition, wt. percent: | | | | |
| $Al_2O_3$ | 98.99 | 75.57 | 65.8 | 60.0. |
| $SiO_2$ | 0.50 | 23.7 | 28.4 | 33.4. |
| CaO | Nil | <0.10 | 2.4 | 3.4. |
| $Fe_2O_3$ | 0.13 | 0.27 | 1.0 | 1.0. |
| $TiO_2$ | 0.01 | 0.09 | 2.2 | 1.9. |
| MgO | Trace | <0.10 | Trace | 0.1. |
| $Na_2O+K_2O$ | 0.37 | 0.40 | 0.2 | 0.2. |

Various modifications and alterations of this invention will become apparent to those skilled in the art without departing from the scope and spirit of this invention, and it should be understood that the invention is not to be limited unduly to that preferred embodiment set forth herein for illustrative purposes.

I claim:
1. The method of constructing a carbon black producing furnace, said furnace comprising a cylindrical shell provided with a reaction chamber, comprising
   (a) filling the bottom portion of said cylindrical shell surrounding said reaction chamber with first castable refractory, disposing in said castable refractory a means which forms a channel in the upper surface thereof with an enlarged channel portion adjacent at least one end of said reaction chamber,
   (b) allowing said castable refractory to set up to a hard mass,
   (c) assembling a cylindrical liner of precast refractory shapes in said channel, said lining being assembled such that a space is provided at said one end of said reaction chamber between said liner and said first castable material,
   (d) filling said space and an area surrounding that portion of said liner adjacent one end of said reaction chamber with second castable refractory,
   (e) allowing the latter to set up to a hard mass,
   (f) filling the upper portion of said shell which comprises the space between said lining, the resulting hardened second castable refractory, and the adjacent inner wall of said shell with further of said first castable refractory,
   (g) allowing the latter refractory to set up to a hard mass,
   (h) and completing the curing of said castable refractories by raising the temperature of said furnace to elevated temperatures.

2. The method of constructing a carbon black producing furnace, said furnace comprising a cylindrical metal shell and provided internally with several chambers including a reaction chamber, comprising
   (a) horizontally suspending a removable semi-cylindrical core within the horizontal lower half of that portion of said shell which will surround said reaction chamber, said core having an enlarged portion near that end of said core adjacent one end of said reaction chamber,
   (b) filling a first castable refractory in the space between the lower outer surface of said core and the adjacent inner wall of said shell,
   (c) removing said core from said shell after said castable refractory has set up to a hard mass leaving a semi-cylindrical channel in the resulting hardened castable refractory conforming to the outer dimensions of said core, said channel including an enlarged channel portion conforming to the outer dimensions of said enlarged portion of said core,
   (d) assembling a cylindrical lining of first precast refractory shapes within said shell to form a lining having a higher degree of refractoriness than said first castable refractory, the inner surface of said lining defining said reaction chamber with at least that portion of said lining adjacent said one end of said reaction chamber being formed of second precast cylindrical refractory shapes having a higher degree of refractoriness than the rest of said lining, said lining being assembled such that a semi-cylindrical space is provided defined by said enlarged channel portion and said second precast refractory,
   (e) placing a removable mold within said shell above said second precast refractory and in communication at its lower end with said space,
   (f) filling said mold and recess with a second castable refractory having a higher degree of refractoriness than said first castable refractory,
   (g) removing said mold from said shell after said second castable refractory has set up to a hard mass surrounding said second precast refractory,
   (h) filling further of said first castable refractory in the space between said lining, the resulting hardened second castable refractory, and the adjacent inner wall of said shell,
   (i) allowing said further first castable refractory to set up to a hard mass,
   (j) and completing the curing of said castable refractories by raising the temperature of said furnace to elevated temperatures.

References Cited by the Examiner

UNITED STATES PATENTS

| 1,341,078 | 5/20 | Schaefer | 25—155.5 |
| 1,643,425 | 9/29 | Summey | 25—155.5 |
| 2,705,190 | 3/55 | Heller | 23—259.5 |
| 2,731,466 | 1/56 | Heffner | 23—259.5 |
| 2,839,825 | 6/58 | Edwards | 25—155.5 |

ALEXANDER H. BRODMERKEL, *Primary Examiner.*

MAURICE A. BRINDISI, *Examiner.*